(12) United States Patent
Frederiksen et al.

(10) Patent No.: US 9,014,106 B2
(45) Date of Patent: Apr. 21, 2015

(54) METHOD, APPARATUS AND COMPUTER READABLE MEDIUM EMBODYING A PROGRAM FOR RESOURCE ALLOCATION

(75) Inventors: Frank Frederiksen, Klarup (DK); Esa Tapani Tiirola, Kempele (FI); Bernhard Raaf, Neuried (DE); Kari Pekka Pajukoski, Oulu (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 758 days.

(21) Appl. No.: 13/319,222

(22) PCT Filed: May 8, 2009

(86) PCT No.: PCT/EP2009/055597
§ 371 (c)(1),
(2), (4) Date: Jan. 9, 2012

(87) PCT Pub. No.: WO2010/127708
PCT Pub. Date: Nov. 11, 2010

(65) Prior Publication Data
US 2012/0127939 A1    May 24, 2012

(51) Int. Cl.
*H04W 72/04* (2009.01)
*H04L 5/00* (2006.01)

(52) U.S. Cl.
CPC .......... *H04L 5/0092* (2013.01); *H04L 5/0042* (2013.01); *H04L 5/0058* (2013.01)

(58) Field of Classification Search
None
See application file for complete search history.

(56) References Cited

U.S. PATENT DOCUMENTS

| | | | |
|---|---|---|---|
| 2008/0004030 A1* | 1/2008 | Frederiksen et al. | 455/450 |
| 2008/0085703 A1* | 4/2008 | Michaelsen et al. | 455/422.1 |
| 2008/0117867 A1* | 5/2008 | Yin et al. | 370/329 |
| 2009/0041138 A1* | 2/2009 | Li et al. | 375/260 |
| 2009/0238241 A1* | 9/2009 | Hooli et al. | 375/133 |
| 2009/0325585 A1* | 12/2009 | Farajidana et al. | 455/450 |
| 2012/0106473 A1* | 5/2012 | Tiirola et al. | 370/329 |

FOREIGN PATENT DOCUMENTS

| | | |
|---|---|---|
| CN | 101371609 A | 2/2009 |
| EP | 2 056 502 A1 | 5/2009 |

(Continued)

OTHER PUBLICATIONS

R1-073256, 3GPP TSG-RAN WG1 #50, Athens, Greece, Aug. 20-24, 2007, "Subband (island) based allocation for PDSCH" Qualcomm Europe, 9 pgs.

(Continued)

*Primary Examiner* — Anez Ebrahim
*Assistant Examiner* — Duc Duong
(74) *Attorney, Agent, or Firm* — Harrington & Smith (57) ABSTRACT

Apparatus and method for resource allocation are provided. An apparatus includes a controller configured to: utilize a tree structure with more than one branch in the resource allocation of physical resource blocks, each branch including one or more legal starting positions for resource allocation. Each starting position is associated with a cluster of physical resource blocks, the number of starting positions being different on each branch. The size of the resource clusters of each branch is different. The controller is configured to denote each resource cluster with a predefined index, and allocate one or more clusters to user equipment uplink connection.

26 Claims, 7 Drawing Sheets

(56) References Cited

FOREIGN PATENT DOCUMENTS

| JP | 2010526499 A | 7/2010 |
|----|--------------|--------|
| WO | WO 2007/082754 A1 | 7/2007 |
| WO | WO2008/137786 A1 | 11/2008 |
| WO | WO 2009/013260 A1 | 1/2009 |

OTHER PUBLICATIONS

"Resource Allocation Signaling for E-UTRA", NEC Group, TSG-RAN WG#45, R1-061308, May 2006, 14 pgs.

* cited by examiner

METHOD, APPARATUS AND COMPUTER READABLE MEDIUM EMBODYING A PROGRAM FOR RESOURCE ALLOCATION

FIELD

The exemplary and non-limiting embodiments of the invention relate generally to wireless communication networks, and more specifically, to resource allocation.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

An important factor in designing a future communication system is a cost-effective support of high data rates and efficient resource utilization. One communication system supporting high data rates is the 3rd Generation Partnership Project (3GPP) Long Term Evolution (LTE) Release 8. An improved version of the Long Term Evolution radio access system is called LTE-Advanced (LTE-A). The LTE is designed to support high-speed data, multimedia unicast and multimedia broadcast services.

Typically, high data rates also set increased requirements for control signalling and resource allocation. In LTE Release 8, it is possible to allocate a continuous set of resources in frequency for uplink transmission on PUSCH (Physical Uplink Shared Channel). However, it can be expected that more flexibility is needed in resource allocation. A flexible resource allocation method would provide the network means for utilizing the available spectrum better and allow more flexible allocations for individual user equipment.

In addition to flexibility, the signalling load must be taken into account in the design of resource allocation.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to an aspect of the present invention, there is provided a method comprising: utilizing a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, denoting each resource cluster with a predefined index, and allocating one or more clusters to user equipment uplink connection.

In an embodiment, the sizes of clusters on the branches are based on powers of at least one given integer.

According to an aspect of the present invention, there is provided an apparatus comprising a controller configured to: utilize a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, denote each resource cluster with a predefined index, and allocate one or more clusters to user equipment uplink connection.

In an embodiment, a controller is further configured to utilize a tree structure where the sizes of clusters on the branches are based on powers of at least one given integer.

In an embodiment, the apparatus comprises a transmitter configured to signal the allocated resources to user equipment.

According to an aspect of the present invention, there is provided an apparatus comprising: a receiver configured to receive an uplink resource allocation; a transmitter configured to transmit using the allocated resource; a controller configured to control a transmitter to utilize a resource allocation based on a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, and each resource cluster being denoted with a predefined index, wherein the resource allocation comprises indexes of one or more clusters.

According to an aspect of the present invention, there is provided an apparatus comprising: means for utilizing a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, means for denoting each resource cluster with a predefined index, and means for allocating one or more clusters to a user equipment uplink connection.

According to an aspect of the present invention, there is provided an apparatus comprising: a receiver configured to receive an uplink resource allocation; a transmitter configured to transmit using the allocated resource; a controller configured to control a transmitter to utilize a resource allocation based on a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, and each resource cluster being denoted with a predefined index, wherein the resource allocation comprises indexes of one or more clusters.

According to another aspect of the present invention, there is provided an apparatus comprising: means for utilizing a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, means for denoting each resource cluster with a predefined index, and means for allocating one or more clusters to a user equipment uplink connection.

According to another aspect of the present invention, there is provided a computer readable memory embodying a program of instructions executable by a processor to perform actions directed toward resource allocation of physical resource blocks, the actions comprising: utilizing a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, denoting each resource cluster with a predefined index, and allocating one or more clusters to a user equipment uplink connection.

According to yet another aspect of the present invention, there is provided a computer readable memory embodying a program of instructions executable by a processor to perform actions directed toward resource allocation of physical resource blocks, the actions comprising: utilizing a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, denoting each resource cluster with a predefined index, and allocating one or more clusters to a user equipment uplink connection.

LIST OF DRAWINGS

Embodiments of the present invention are described below, by way of example only, with reference to the accompanying drawings, in which.

DESCRIPTION OF SOME EMBODIMENTS

Exemplary embodiments of the present invention will now be described more fully with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of the present invention are applicable to any user terminal, server, corresponding component, and/or to any communication system or any combination of different communication systems where resource blocks are allocated for users. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

In the following, different embodiments will be described using, as an example of a system architecture whereto the embodiments may be applied, an architecture based on LTE/SAE (Long Term Evolution/System Architecture Evolution) network elements without, however, restricting the embodiment to such an architecture.

Figure 1A:
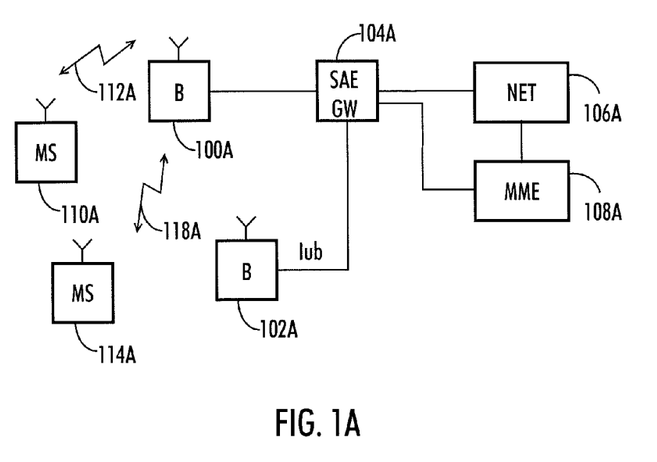
FIG. 1A shows a simplified block diagram illustrating an exemplary system architecture.

With reference to FIG. 1A, let us examine an example of a radio system to which embodiments of the invention can be applied. In this example, the radio system is based on LTE/SAE (Long Term Evolution/System Architecture Evolution) network elements. However, the invention described in these examples is not limited to the LTE/SAE radio systems but can also be implemented in other radio systems.

A general architecture of a communication system is illustrated in FIG. 1A. FIG. 1A is a simplified system architecture only showing some elements and functional entities, all being logical units whose implementation may differ from what is shown. The connections shown in FIG. 1A are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

The exemplary radio system of FIG. 1A comprises a service core of an operator including the following elements: an MME (Mobility Management Entity) 108A and an SAE GW (SAE Gateway) 104A.

Base stations that may also be called eNBs (Enhanced node Bs) 100A, 102A of the radio system host the functions for Radio Resource Management: Radio Bearer Control, Radio Admission Control, Connection Mobility Control, Dynamic Resource Allocation (scheduling). The MME 108A is responsible for distributing paging messages to the eNBs 100A, 102A.

FIG. 1A shows user equipment 110A and 114A communicating 112A, 118A with the eNodeB 100A. The user equipment refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

The connections 112A, 118A may relate to calls/services which may be "long distance" where user traffic passes via the SAE GW 104A. For example, a connection from the user equipment 110A and 114A to an external IP network, such as to the Internet 106A, may be guided via the SAE GW 108. However, local calls/services are also possible in the exemplary radio system.

FIG. 1A only illustrates a simplified example. In practice, the network may include more base stations and radio network controllers, and more cells may be formed by the base stations. The networks of two or more operators may overlap, the sizes and form of the cells may vary from that depicted in FIG. 1, etc.

The physical layer of the LTE includes orthogonal frequency division multiple access (OFDMA) and multiple-input and multiple-output (MIMO) data transmission. For example, the LTE deploys the OFDMA for the downlink transmission and single carrier frequency division multiple access (SC-FDMA) for the uplink transmission. In OFDMA, the transmission frequency band is divided into multiple sub-carriers orthogonal to each other. Each sub-carrier may transmit data to a specific UE 110A, 114A. Thus, multiple access is achieved by assigning subsets of sub-carriers to any individual UE 110A, 114A. SC-FDMA utilizes single carrier modulation, orthogonal frequency domain multiplexing and frequency domain equalization.

It should be appreciated that the communication system may also comprise other core network elements besides SAE GW 104A and MME 108A not shown in FIG. 1A. Direct communication between different eNodeBs over an air interface is also possible by implementing a relay node concept, wherein a relay node may be considered as a special eNodeB having wireless backhauls or, for instance, X2 and S1 interfaces relayed over the air interface by another eNodeB. The communication system is also able to communicate with other networks, such as a public switched telephone network.

The embodiments are not, however, restricted to the network given above as an example, but a person skilled in the art may apply the solution to other communication networks provided with the necessary properties. For example, the connections between different network elements may be realized with Internet Protocol (IP) connections.

Figure 1B:
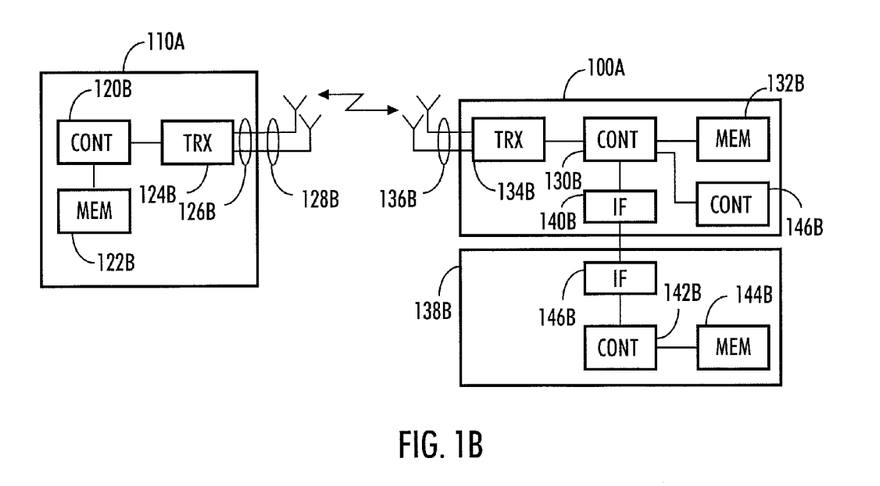
FIG. 1B illustrates examples of apparatuses according to embodiments of the invention.

FIG. 1B illustrates examples of apparatuses according to embodiments of the invention. FIG. 1B shows user equipment 110A configured to be in connection with a base station 100A on a communication channel 112A. The user equipment 110A comprises a controller 120B operationally connected to a memory 122B and a transceiver 124B. The controller 120B controls the operation of the user equipment. The memory 122B is configured to store software and data. The transceiver is configured to set up and maintain a wireless connection to the base station 100A. The transceiver is operationally connected to a set of antenna ports 126B connected to an antenna arrangement 128B. The antenna arrangement may comprise a set of antennas. The number of antennas may be two to four, for example. The number of antennas is not limited to any particular number.

The base station or eNodeB 100A comprises a controller 130B operationally connected to a memory 132B and a transceiver 134B. The controller 130B controls the operation of the base station. The memory 132B is configured to store software and data. The transceiver 134B is configured to set up and maintain a wireless connection to user equipment within the service area of the base station. The transceiver 134B is operationally connected to an antenna arrangement 136B. The antenna arrangement may comprise a set of antennas. The number of antennas may be two to four, for example. The number of antennas is not limited to any particular number.

The base station may be operationally connected to another network element 138B of the communication system. The network element 138B may be a radio network controller, another base station, a gateway, or a server, for example. The base station may be connected to more than one network element. The base station 100A may comprise an interface 140B configured to set up and maintain the connection with the network element. The network element 138B may comprise a controller 142B and a memory 144B configured to store software and data and an interface 146B configured to be in connection with the base station. In an embodiment, the network element is connected to the base station via another network element.

In the uplink direction, the LTE-A provides a Physical Uplink Shared Channel (PUSCH) for transmitting user data. The resources of PUSCH are allocated by the network and signalled on a control channel to user equipment. The resources of PUSCH are allocated as Physical Resource Blocks (PRB). For example, if the system bandwidth of an LTE-A system is 20 MHZ, a PUCSCH frame comprises 100 physical resource blocks. In an embodiment, the control channel used for signalling the resource allocations is a Physical Downlink Control Channel (PDCCH). In an embodiment, the resources are allocated by a scheduler in each eNodeB 100A, 102A. The scheduler may be realized as a software component executed by the controller 130B or as a separate controller 146B. The eNodeB 100A is configured to transmit information regarding the allocation to user equipment 110A, 114A.

In LTE, where one continuous set or a cluster of PRBs is allocated for uplink transmission of user equipment, the signalling size of the resource allocation is 11 bits on a 10 MHz bandwidth and 13 bits on a 20 MHz band-width. A cluster of PRBs may be defined as contiguous resource allocation with a pre-determined starting position and a size in frequency. The starting position and size are defined in relation to the minimum resource allocation granularity which equals to one physical resource block. The resource allocation is signalled to user equipment by indicating the PRB from which the cluster of resource allocation starts and the length of the cluster (in terms of the number of PRBs).

In an embodiment of the invention, more than one cluster is allocated to user equipment. Thus, the resources may comprise more than one continuous set of PRBs. This solution achieves more flexible usage of resources than the single cluster method.

In an embodiment, a tree structure is utilized in defining the clusters to be allocated to user equipment. The tree structure comprises more than one branch and each branch comprises one or more legal starting positions for resource allocation. Each starting position defines a cluster of physical resource blocks. On each branch, the number of starting positions is different and the size of the resource clusters of each branch is likewise different.

Each resource cluster may be denoted with a predefined index. When the clusters are signalled to the user equipment, the signalling of the indexes is sufficient.

Figure 2A:
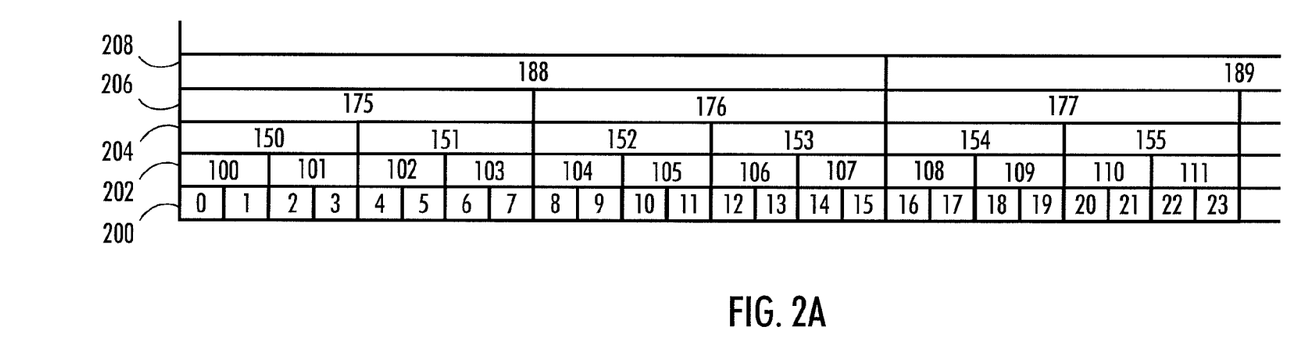
FIGS. 2A to 2E illustrate exemplary resource allocation tree structures.

FIG. 2A illustrates an example of a possible tree structure. Frequency is on the horizontal axis. FIG. 2A illustrates partially five branches 200, 202, 204, 206, 208 and 210 of the tree structure. The branches continue to the right. There may be more branches but for the sake of simplicity they are not shown.

In an embodiment, the available tree may be limited to a predetermined number of physical resource blocks of all resource blocks. Thus, the width and position of the available tree may be subject to configuration.

In this example, the first branch 200 comprises clusters of the size of a single PRB. Assuming that the bandwidth used in the transmission is 20 MHz, there are 100 PRBs. Thus the number of clusters on the first branch is 100. The second branch 202 comprises clusters equal to the size of two PRBs. In this example, the number of clusters on the second branch is 50.

The third branch 204 comprises clusters equal to the size of four PRBs. In this example, the number of clusters on the second branch is 25.

The fourth branch 206 comprises clusters equal to the size of eight PRBs. In this example, the number of clusters on the second branch is 12.

The fifth branch 208 comprises clusters equal to the size of 16 PRBs. In this example, the number of clusters on the second branch is 6.

The tree may comprise additional two branches, where the cluster sizes are 32 and 64.

Each possible cluster is denoted with an index. One possible way of indexing is shown in FIG. 2A. The indexing starts from the first branch 200, where the index runs from 0 to 99. The indexing continues on the second branch 202, where the index runs from 100 to 149. On the third branch 204, the index runs from 150 to 174. On the fourth branch 206, the index runs from 175 to 187. On the fifth branch 208, the index runs from 188 to 194. On the two additional branches not shown in FIG. 2A, the indexes run from 195 to 197. Thus, the highest index number is 197. However, as many clusters overlap, the number of simultaneously available clusters is smaller and depends on the way the clusters are allocated to different user equipment.

The total amount of indexes needed for the resource allocation of a single cluster is 197, which can be signalled using 8 bits in total. Allocating two clusters to user equipment and applying the simplest method of resource allocation signalling (duplicating the resource allocation signalling) would lead to a 16 bit signalling load, which corresponds to an increase of only 3 bits compared to the solution of LTE Release 8.

In an embodiment, the controller or the scheduler is configured to base the sizes of clusters on the branches on powers of a given integer. In the example of FIG. 2A, the sizes of the cluster on the branches are based on powers of 2 (1, 2, 4, 8, 16, . . . ). If the sizes were based on powers of 3, then the sizes of clusters would be 1, 3, 9, 27, . . . . Likewise, if the sizes were based on powers of 4, then the sizes of clusters would be 1, 4, 16, 64, . . . .

In an embodiment, the controller or the scheduler is configured to base the sizes of clusters on the branches on powers of more than one integer. For example, different branches may be based on powers of 2 and 3.

In an embodiment, the signalling load can be reduced by optimizing the use of indexes when allocating more than one cluster to user equipment.

In an embodiment, after allocating a cluster to user equipment for uplink transmission, the scheduler is configured to remove from the tree structure the clusters which overlap or co-side with the allocated cluster and to apply new indexing to each available cluster before allocating further clusters to the user equipment.

Figure 2B:
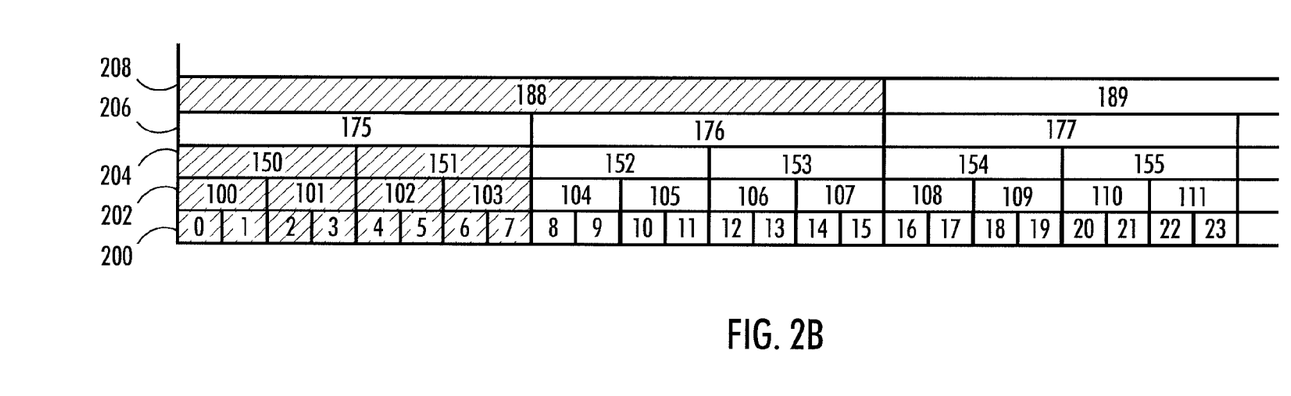

FIG. 2B illustrates this embodiment. In the example of FIG. 2B, let us assume that a cluster having the index 175 is allocated first to user equipment. The scheduler is then configured to remove from the tree structure those clusters which overlap with the allocated cluster 175 because those clusters cannot be allocated to the user equipment. In the example of FIG. 2B, clusters having the indexes 0 to 7, 100 to 103, 150, 151 and 188 are removed from the tree. The remaining clusters are then denoted with new index values which are used when signalling the second cluster to the user equipment. Thus, the number of indexes may be reduced and the signalling load reduced. The process may be repeated again if more than two clusters are allocated.

In an embodiment, after allocating a cluster to user equipment for uplink transmission, the scheduler is configured to divide the clusters of the tree structure in frequency domain into two sections using either the beginning or the end of the allocated cluster as the dividing frequency, to remove from the tree structure the clusters which belong to the section with the allocated cluster, and to apply new indexing to each available cluster before allocating further clusters to the user equipment.

Figure 2C:
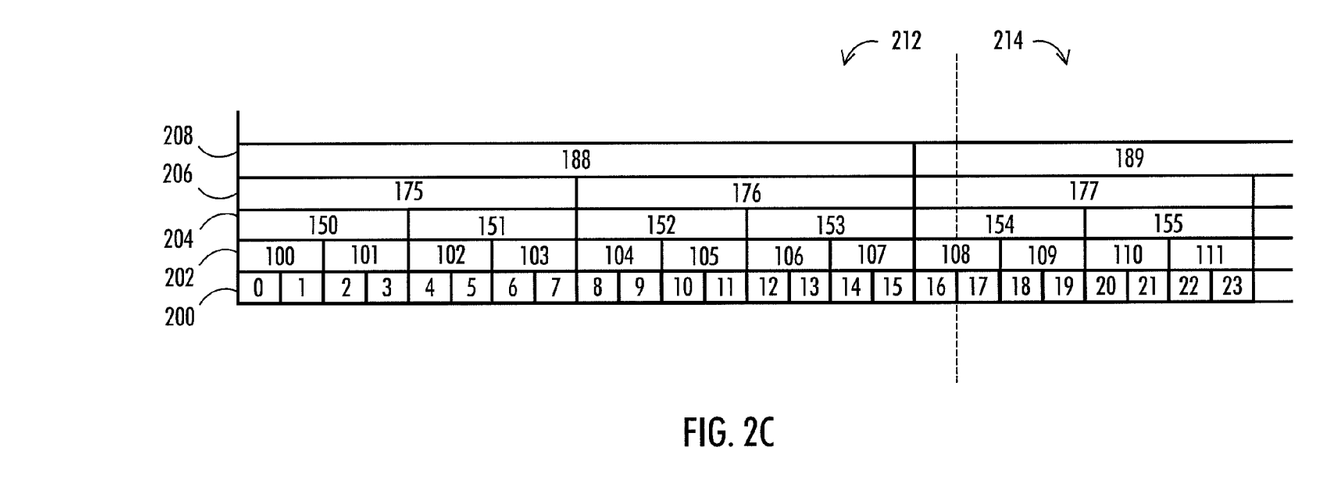

FIG. 2C illustrates this embodiment. In the example of FIG. 2C, let us assume that a cluster having the index 16 is allocated to user equipment. The scheduler is configured to divide the clusters of the tree structure in frequency domain into two sections using either the beginning or the end of the allocated cluster as the dividing frequency. In this example, the tree structure is divided into two sections 212 and 214. The scheduler removes the clusters which belong to the section 212 with the allocated cluster from the tree structure. Those clusters which belong to the section 212 only partially are also removed. Thus, clusters having indexes 189, 177, 154 and 108 are also removed. In the above example, the remaining clusters have indexes 17 to 99, 109 to 149, 155 to 174, 178 to 187 and 190 onwards. The remaining clusters are then denoted with new index values which are used when signalling the second cluster to the user equipment. Thus, the number of indexes may be reduced and the signalling load reduced. The process may be repeated again if more than two clusters are allocated.

The situation of FIG. 2C is only exemplary. In practice, the above method may make use of the fact that when, for example, two clusters are allocated, it doesn't matter in which order the clusters are allocated because the information regarding the allocation is transmitted simultaneously. Thus, for each allocation of two clusters, there is an equivalent dual cluster allocation, where the two clusters are swapped. Selecting as the first cluster the one which is nearer the middle of the available bandwidth gives the optimal reduction in the signalling load because the number of removed clusters is large. This method may reduce to half the number of indexes used when signalling the second cluster, which may remove one bit from the signalling load.

The feature that clusters may be allocated in any order may be utilized in another way. In an embodiment, the scheduler is configured to allocate a cluster to user equipment for uplink transmission, the cluster being smaller than any subsequent cluster to be allocated. As the next cluster to be allocated in larger than the already allocated cluster, the scheduler may remove from the tree structure all the clusters which are smaller than the allocated cluster. The remaining clusters are then denoted with new index values which are used when signalling the second cluster to the user equipment. Thus, the number of indexes may be reduced and the signalling load reduced. The process may be repeated again if more than two clusters are allocated.

Figure 2D:
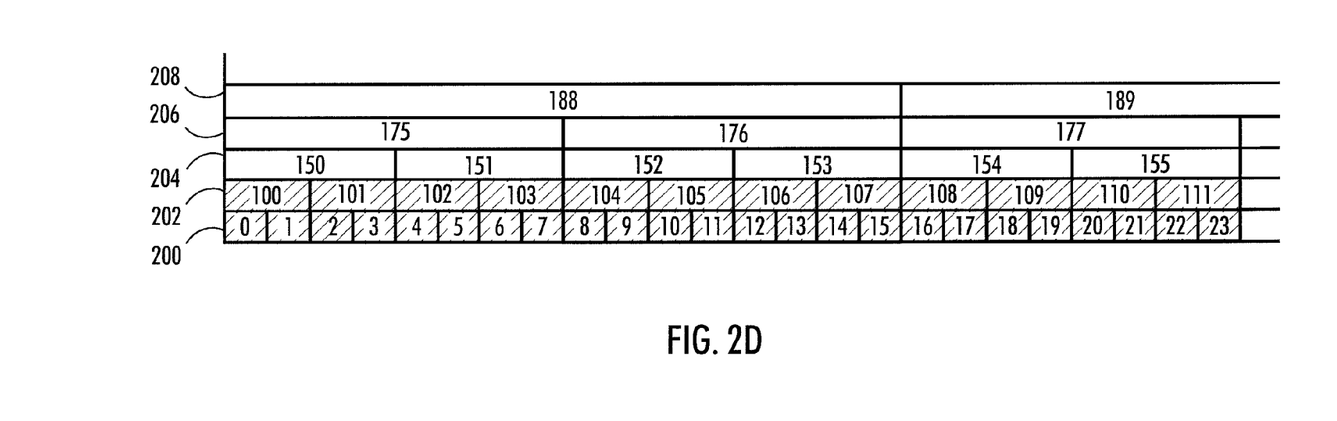

FIG. 2D illustrates this embodiment. In the example of FIG. 2D, let us assume that clusters having indexes 152 and 177 are to be allocated to user equipment. As the cluster having the index 152 is smaller, it is allocated first. Then, all clusters which are smaller in size that the cluster having the index 152 may be removed from the tree. In this example all clusters having the size of one or two PRBs may be removed.

In the above embodiments, there are no restrictions to the allocation of the clusters. However, to obtain higher savings in the signalling load, some restrictions may be utilized. One goal could be to be able to signal the allocation of two clusters using 14 bits, which corresponds to the signalling load of the one cluster/20 MHz case in LTE Release 8 (including the frequency hopping flag; it is assumed that frequency hopping is not used with clustered resource block mapping).

If no optimizations are done in the resource allocation (including the above described methods), then the number of states needed at 20 MHz is 4940.

In an embodiment, the scheduler is configured to allocate a first cluster and a second cluster to user equipment, the first cluster having an even or odd index value and the second cluster having an odd index value. This would save ¼ of states, i.e., 3712 states would be needed. In the example of FIG. 2A, let us assume that the first cluster is odd and the second cluster is even (using the original indexing). After selecting the index of the first cluster, the odd numbered clusters can be removed from the tree and the remaining clusters denoted with new index values.

In an embodiment, the scheduler is configured to allocate clusters to user equipment, wherein all clusters have either even or odd index value. This method will save half of the states, that is, 2475.

In an embodiment, the scheduler is configured to allocate clusters to user equipment, the cluster having even or odd index values, and the allocation is based on a predetermined property of the user equipment. The property may be user equipment identification (ID) or some other user equipment specific property. The property may also change with time. For example, the property may be a function of the user equipment ID and a subframe number. This method may save up to ¾ of the states, down to 1238, and allows signalling of all remaining states with just 14 bits.

In an embodiment, the scheduler is configured to allocate a cluster with an index m to user equipment; and allocate a second cluster with an index n-m, where n is the total number of clusters on the particular branch. This restricts the allocation of clusters having the size of one PRB. Only specific combinations of clusters are allowed. This still allows exploiting diversity for allocating single PRBs, but it is not possible to schedule allocations of two single PRB clusters in the "holes" that are left after scheduling other users.

Figure 2E:
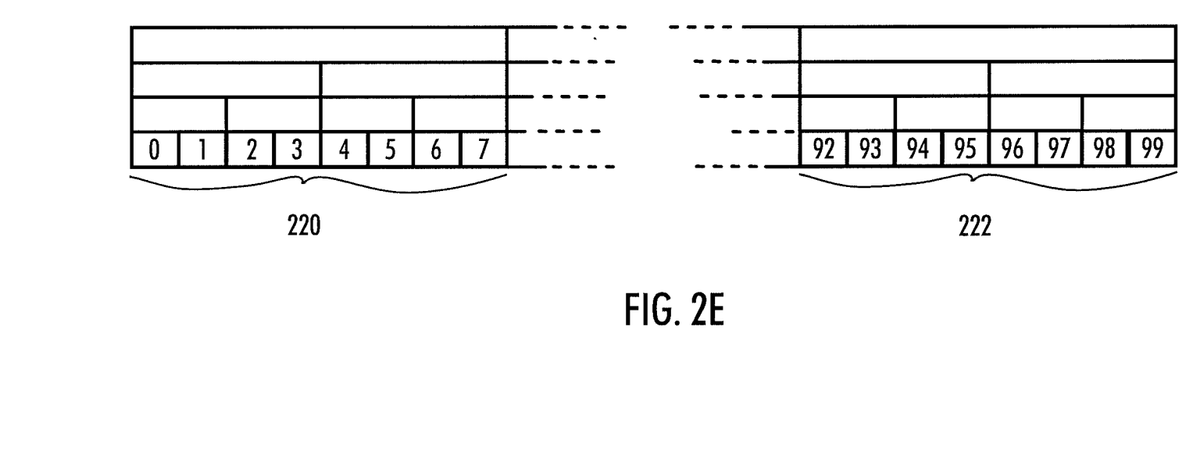

In an embodiment, the scheduler is configured to allocate clusters having a length of a single physical resource block only from either the beginning or the end of the resource block space. FIG. 2E illustrates this embodiment. The resource space may have predetermined areas 220, 222 at the beginning and the end of the resource block space from which clusters of a single PRB size may be allocated.

In an embodiment, the scheduler is configured to align the resource allocation tree structure at least partially with the tree structure used in the allocation of a sounding reference signal (SRS). The sounding reference signal is a signal transmitted by the user equipment providing information regarding uplink channel quality. The network may utilize the channel information on the uplink resource allocation (i.e., scheduling of the clusters).

Figure 3A:
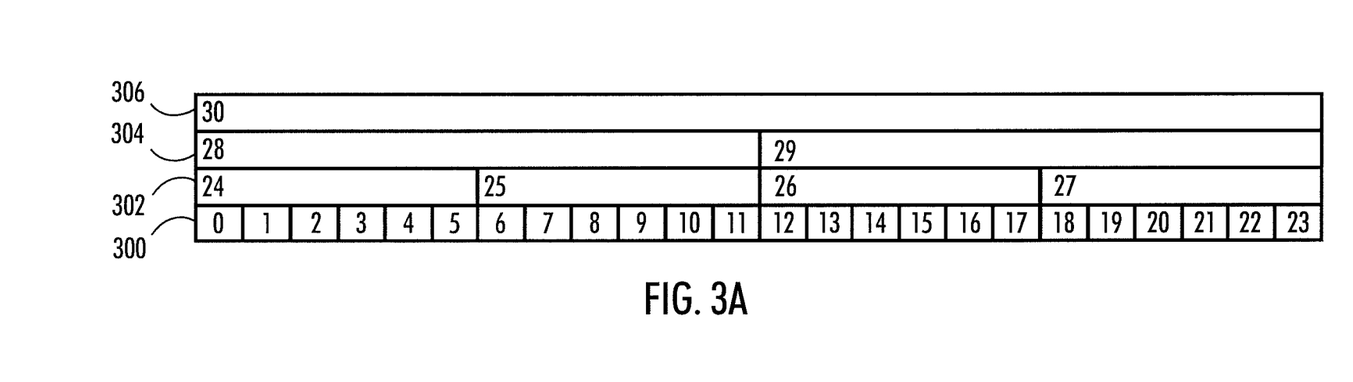
FIGS. 3A and 3B illustrate two examples of sounding reference signal tree structures.
Figure 3B:
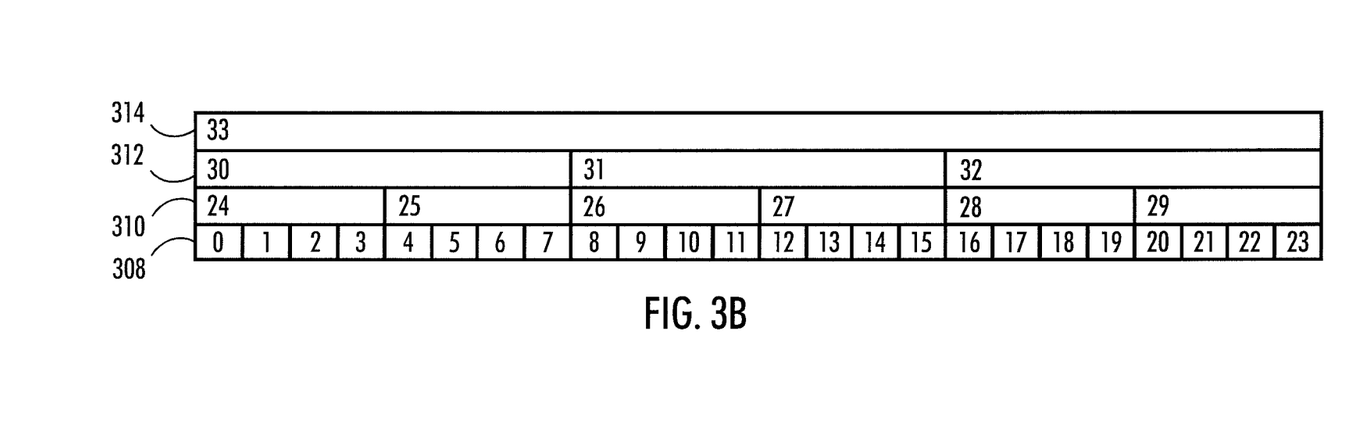

In LTE, the available sounding reference signal bandwidths are in the form of a tree structure, comprising several branches. FIGS. 3A and 3B illustrate two examples of the SRS tree structure. In FIG. 3A, the tree comprises four branches 300, 302, 304 and 306, where on the first branch 300, the size of each cluster is four physical resource blocks, and the sizes of the other branches 302, 304 and 306 are 24, 48 and 96, correspondingly. In FIG. 3B, the tree comprises four branches 308, 310, 312 and 314, where on the first branch 308, the size of each cluster is four physical resource blocks, and the sizes of the other branches 310, 312 and 314 are 16, 48 and 96, correspondingly.

In an embodiment, the scheduler is configured to align the resource allocation tree structure with the tree structure used in the allocation of the sounding reference signal starting from the resource allocation tree branch having clusters equal to the size of four physical resource blocks. As the sounding reference signal gives uplink channel information to the network, the channel information is the most accurate if the tree structure and SRS structure are aligned.

The network may configure the tree structure used in the allocation of the sounding reference signal for each cell separately.

Figure 4A:
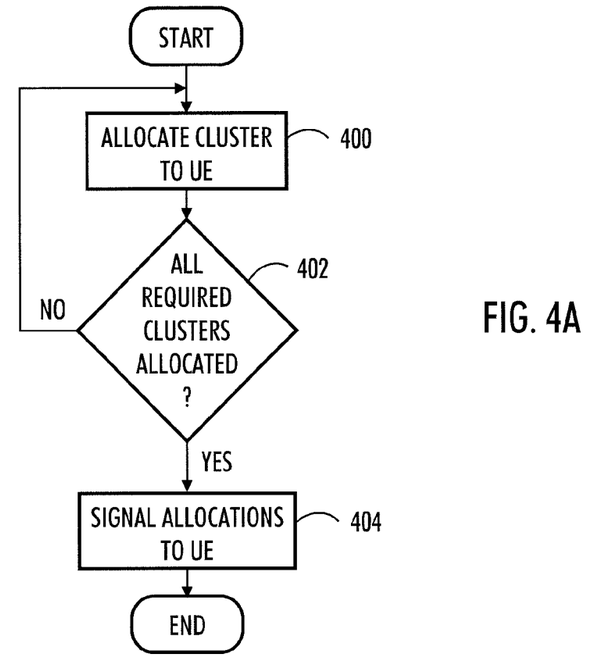
FIGS. 4A, 4B and 4C are flowcharts illustrating embodiments.

FIG. 4A is a flowchart illustrating an embodiment. In step 400, a cluster is allocated to user equipment utilizing a tree structure with more than one branch in the resource allocation of physical resource blocks, each branch comprising one or more starting positions for resource allocation, each starting position defining a cluster of physical resource blocks, the number of starting positions being different on each branch, the size of the resource clusters of each branch being different, and denoting each resource cluster with a predefined index.

In step 402, it is checked whether all required clusters have been allocated.

If not, step 400 is repeated.

If yes, the allocations are signalled to the user equipment in step 404.

Figure 4B:
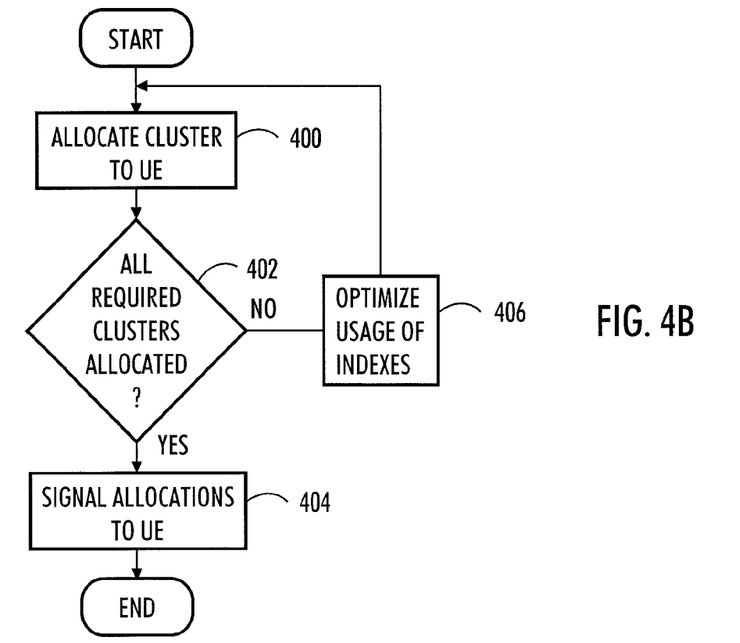

FIG. 4B is a flowchart illustrating another embodiment. In step 400, a cluster is allocated to user equipment utilizing a tree structure with more than one branch in the resource allocation of physical resource blocks, each branch comprising one or more starting positions for resource allocation, each starting position defining a physical resource block cluster, the number of starting positions being different on each branch, the size of the resource clusters of each branch being different, and denoting each resource cluster with a predefined index.

In step 402, it is checked whether all required clusters have been allocated.

If not, the usage of indexes is optimized in step 406. The optimization may comprise removing a set of clusters from the tree as described above and applying new indexes to the remaining clusters. The optimization may also comprise applying specific rules when selecting clusters for allocation. After the optimization, step 400 is repeated.

If yes, the allocations are signalled to the user equipment.

Figure 4C:
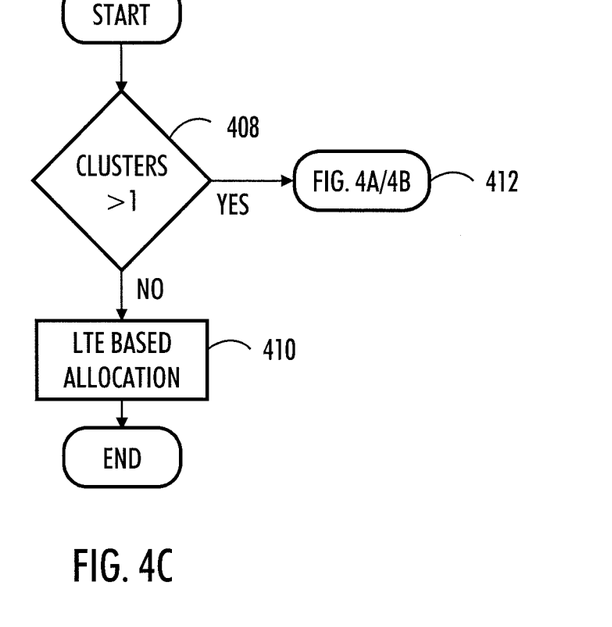

FIG. 4C is a flowchart illustrating yet another embodiment. In step 408, the number of clusters that are to be allocated to the user equipment is determined. If only one cluster is to be allocated, then the scheduler is configured to utilize LTE-based allocation and signalling in step 410. This way, backwards compatibility with LTE-based devices capable of utilising only one cluster is guaranteed.

If more than one cluster is to be allocated (or is to be supported), then the process continues either according to FIG. 4A or FIG. 4B in step 412.

Figure 5:
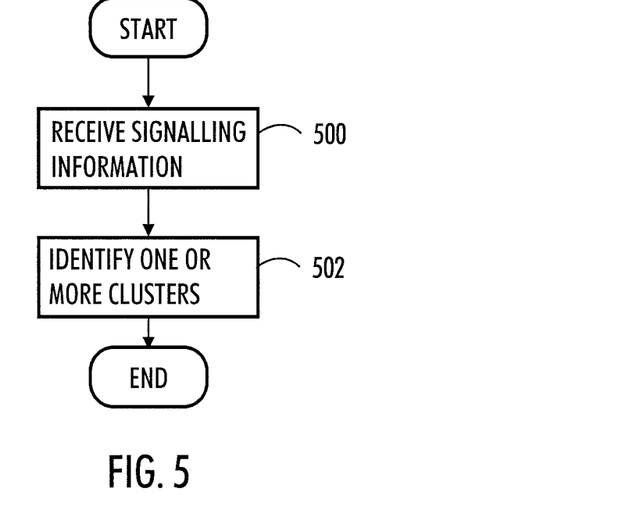
FIG. 5 is a flowchart illustrating an embodiment from the user equipment point of view.

FIG. 5 and FIG. 1B illustrate embodiments of the invention from the user equipment point of view.

The user equipment may comprise a receiver 124B configured to receive an uplink resource allocation; and a transmitter 124B configured to transmit using the allocated resource. In FIG. 1 B, the receiver and transmitter are combined to a transceiver, but they may be realized as separate devices as one skilled in the art is well aware.

The controller 120B of the user equipment is configured to control the transceiver 124B to utilize a resource allocation based on a tree structure with more than one branch in the resource allocation of physical resource blocks, each branch comprising one or more starting positions for resource allocation, each starting position defining a physical resource block cluster, the number of starting positions being different on each branch, the size of the resource clusters of each branch being different, each resource cluster being denoted with a predefined index, wherein the resource allocation comprises indexes of one or more clusters.

FIG. 5 is a flowchart illustrating an embodiment from the user equipment point of view. In step 500 of FIG. 5, the user equipment receives signalling information from the eNodeB. The signalling information comprises information regarding uplink resource allocation for the user equipment.

In step 502, the user equipment determines the allocated clusters from the signalling information. The signalling information may comprise the indexes of the clusters. The user equipment determines the indexing scheme used. The first and subsequent clusters of the resource allocation may utilize a different indexing scheme due to possible optimization as described above. The optimization methods are predetermined and the user equipment is aware of the usage of the indexes.

Apparatuses able to perform the above-described steps and actions may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the uplink transmission of control signals of user equipment utilizing single user multiple input multiple output transmission as described above.

The computer program may be in source code form, object code form, or in some intermediate form, and it may be stored on some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   utilizing a tree structure with more than one branch in the resource allocation of physical resource blocks,
      each branch comprising one or more legal starting positions for resource allocation,
      each starting position being associated with a cluster of physical resource blocks, the number of starting positions being different on each branch, the size of the resource clusters of each branch being different,
   denoting each resource cluster with a predefined index;
   allocating one or more clusters to user equipment for uplink transmission;
   removing from the tree structure the clusters which overlap with the allocated one or more clusters; and
   redenoting each available cluster with a predefined index before allocating further clusters to the user equipment.

2. The method according to claim 1, wherein the sizes of clusters on the branches are based on powers of at least one given integer.

3. The method according to claim 1, further comprising: signalling the allocated resources to user equipment.

4. The method according to claim 1, further comprising:
   allocating a cluster to user equipment for uplink transmission;
   dividing the clusters of the tree structure in frequency domain into two sections using either the beginning or the end of the allocated cluster as the dividing frequency;
   removing from the tree structure the clusters which belong to the section including the allocated cluster, and
   redenoting each available cluster with a predefined index before allocating further clusters to the user equipment.

5. The method according to claim 1, wherein
the first cluster allocated to user equipment has an even or odd index value and the second cluster allocated to the user equipment has an odd index value.

6. The method according to claim 1, wherein all clusters allocated to user equipment have either an even or odd index value.

7. The method according to claim 6, wherein the user equipment is allocated even or odd index values depending on a predetermined property of the user equipment.

8. The method according to claim 1, further comprising:
   allocating a cluster with an index m to user equipment; and
   allocating a second cluster with an index n-m, where n is the total number of clusters within a branch.

9. The method according to claim 1, further comprising:
   allocating clusters having a length of a single physical resource block only from either the beginning or the end of the resource block space.

10. The method according to claim 1, further comprising:
aligning the resource allocation tree structure with the tree structure used in the allocation of a sounding reference signal.

11. A method comprising:
   utilizing a tree structure with more than one branch in the resource allocation of physical resource blocks,
      each branch comprising one or more legal starting positions for resource allocation,
      each starting position being associated with a cluster of physical resource blocks, the number of starting positions being different on each branch, the size of the resource clusters of each branch being different;
   denoting each resource cluster with a predefined index;
   allocating a cluster to user equipment for uplink transmission, the cluster being smaller than any subsequent cluster to be allocated;

removing from the tree structure the clusters which are smaller than the allocated cluster; and redenoting each available cluster with a predefined index before allocating further clusters to the user equipment.

12. An apparatus comprising a controller configured to:
utilize a tree structure with more than one branch in the resource allocation of physical resource blocks,
each branch comprising one or more legal starting positions for resource allocation,
each starting position being associated with a cluster of physical re-source blocks, the number of starting positions being different on each branch, the size of the resource clusters of each branch being different,
denote each resource cluster with a predefined index;
allocate one or more clusters to user equipment for uplink transmission;
remove from the tree structure the clusters which overlap with the allocated one or more clusters; and
redenote each available cluster with a predefined index before allocating further clusters to the user equipment.

13. The apparatus of claim 12, comprising a controller further configured to utilize a tree structure where the sizes of clusters on the branches are based on powers of at least one given integer.

14. The apparatus of claim 12, comprising a transmitter con-figured to signal the allocated resources to user equipment.

15. The apparatus of claim 12, comprising a controller further configured to
allocate a cluster to user equipment for uplink transmission;
divide the clusters of the tree structure in frequency domain into two sections using either the beginning or the end of the allocated cluster as the dividing frequency;
remove from the tree structure the clusters which belong to the section including the allocated cluster, and
redenote each available cluster with a predefined index before allocating further clusters to the user equipment.

16. The apparatus of claim 12, comprising a controller further configured to
allocate a first cluster and a second cluster to user equipment, the first cluster having an even or odd index value and the second cluster having an odd index value.

17. The apparatus of claim 12, comprising a controller further configured to
allocate clusters to user equipment, all clusters having either an even or odd index value.

18. The apparatus of claim 17, comprising a controller further configured to
allocate clusters to user equipment, the clusters having even or odd index values depending on a predetermined property of the user equipment.

19. The apparatus of claim 12, comprising a controller further configured to
allocate a cluster with an index m to user equipment; and
allocate a second cluster with an n-m, where n is the total number of clusters within a branch.

20. The apparatus of claim 12, comprising a controller further configured to
allocate clusters having a length of a single physical resource block only from either the beginning or the end of the resource block space.

21. The apparatus of claim 12, comprising a controller further configured to
align the resource allocation tree structure with the tree structure used in the allocation of a sounding reference signal.

22. An apparatus, comprising a controller configured to
utilize a tree structure with more than one branch in the resource allocation of physical resource blocks,
each branch comprising one or more legal starting positions for resource allocation,
each starting position being associated with a cluster of physical re-source blocks, the number of starting positions being different on each branch, the size of the resource clusters of each branch being different,
denote each resource cluster with a predefined index;
allocate a cluster to user equipment for uplink transmission, the cluster being smaller than any subsequent cluster to be allocated
remove from the tree structure the clusters which are smaller than the allocated cluster; and
redenote each available cluster with a predefined index before allocating further clusters to the user equipment.

23. An apparatus comprising:
a receiver configured to receive an uplink resource allocation; and
a transmitter configured to transmit using the allocated resource,
wherein the allocated resource comprises one or more clusters that are determined using a tree structure with more than one branch in the resource allocation of physical resource blocks,
each branch comprising one or more legal starting positions for resource allocation,
each starting position being associated with a cluster of physical re-source blocks, the number of starting positions being different on each branch, the size of the resource clusters of each branch being different,
each resource cluster being denoted with a predefined index,
the clusters which overlap with the one or more clusters of the allocated resource are removed from the tree structure, and
each available cluster is redenoted with a predefined index before allocating further clusters to the user equipment.

24. An apparatus comprising:
a receiver configured to receive an uplink resource allocation; and
a transmitter configured to transmit using the allocated resource, wherein the allocated resource comprises one or more clusters that are determined using a tree structure with more than one branch in the resource allocation of physical resource blocks,
each branch comprising one or more legal starting positions for resource allocation,
each starting position being associated with a cluster of physical resource blocks, the number of starting positions being different on each branch, the size of the resource clusters of each branch being different,
each resource cluster being denoted with a predefined index,
the clusters which are smaller than the one or more clusters of the allocated resource are removed the tree structure, and
each available cluster is redenoted with a predefined index before allocating further clusters to the user equipment.

25. A computer readable memory embodying a program of instructions executable by a processor to perform actions directed toward resource allocation of physical resource blocks, the actions comprising:
receiving an uplink resource allocation; and
transmitting using the allocated resource, wherein the allocated resource allocation comprises one or more clusters that are determined using a tree structure with more than one branch in the resource allocation of physical resource blocks, each branch comprising one or more legal starting positions for resource allocation, each starting position being associated with a cluster of physical re-source blocks, the number of starting positions being different on each branch, the size of the resource clusters of each branch being different, each resource cluster being denoted with a predefined index, the clusters which overlap with the one or more clusters of the allocated resource are removed from the tree structure, and each available cluster is redenoted with a predefined index before allocating further clusters to the user equipment.

26. A computer readable memory embodying a program of instructions executable by a processor to perform actions directed toward resource allocation of physical resource blocks, the actions comprising:

receiving an uplink resource allocation; and transmitting using the allocated resource, wherein the allocated resource allocation comprises one or more clusters that are determined using a tree structure with more than one branch in the resource allocation of physical resource blocks, each branch comprising one or more legal starting positions for resource allocation, each starting position being associated with a cluster of physical resource blocks, the number of starting positions being different on each branch, the size of the resource clusters of each branch being different, each resource cluster being denoted with a predefined index, the clusters which are smaller than the one or more clusters of the allocated resource are removed from the tree structure, and each available cluster is redenoted with a predefined index before allocating further clusters to the user equipment.

\* \* \* \* \*